United States Patent [19]

Kaufmann

[11] 4,092,880
[45] June 6, 1978

[54] APPARATUS FOR STRIPPING INSULATION FROM AN ELECTRICAL CONDUCTOR OR THE LIKE

[75] Inventor: Kurt Kaufmann, Kloten, Switzerland
[73] Assignee: Contraves AG, Zurich, Switzerland
[21] Appl. No.: 784,261
[22] Filed: Apr. 4, 1977
[30] Foreign Application Priority Data
Apr. 22, 1976 Switzerland .......................... 5042/76
[51] Int. Cl.² ............................................. H02G 1/12
[52] U.S. Cl. .................................................. 81/9.5 A
[58] Field of Search ............... 81/9.5 R, 9.5 A, 9.5 B, 81/9.5 C, 9.51

[56] References Cited

U.S. PATENT DOCUMENTS

| | | | |
|---|---|---|---|
| 2,724,985 | 11/1955 | Chamberlin | 85/9.5 A |
| 3,089,367 | 5/1963 | Schluter | 81/9.5 A |
| 3,727,492 | 4/1973 | Zanni | 81/9.5 A |

*Primary Examiner*—N. P. Godici
*Attorney, Agent, or Firm*—Werner W. Kleeman

[57] ABSTRACT

An insulation stripping apparatus for partially removing an end section of insulation sheathing or covering of an electrical conductor or the like, comprising a thrust or push rod arranged to be axially displaceable in a housing and acting against the restoring force of a spring. A holder clamp is operatively connected with the thrust or push rod. The holder clamp with the thrust rod and a stripper clamp arranged in the holder clamp and force-lockingly connected with a traction rod provided in the thrust rod, are guided to be axially displaceable in a sleeve fixedly connected with the housing. The holder and stripper clamps are arranged and structured such that, on the one hand, during a holding- and cutting operation the holder clamp together with the thrust rod as well as the stripper clamp together with the traction rod are conjointly guided, and, on the other hand, during the removal operation when there is withdrawn the end section of the insulation sheathing, the stripper clamp together with the traction rod are guided to be axially displaceable relative to the holder clamp.

12 Claims, 7 Drawing Figures

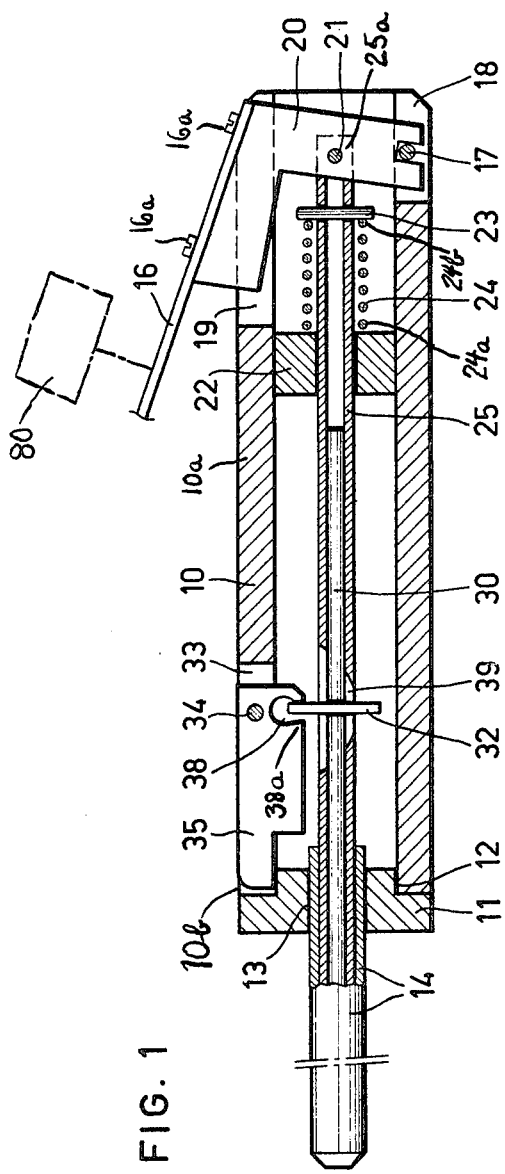
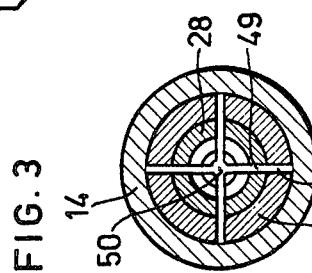
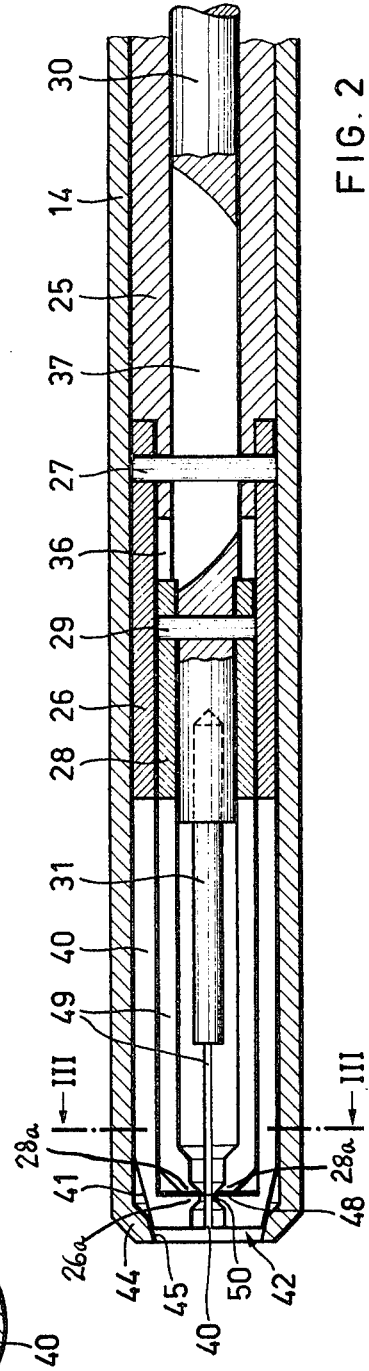
FIG. 1
FIG. 3
FIG. 2

APPARATUS FOR STRIPPING INSULATION FROM AN ELECTRICAL CONDUCTOR OR THE LIKE

BACKGROUND OF THE INVENTION

The present invention relates to a new and improved construction of insulation removal apparatus for the partial removal of an end section of an insulation sheathing or covering of an electrical conductor or the like, which apparatus is of the type comprising a thrust rod arranged to be axially displaceable in a housing and acting against the restoring force of a spring, and a holder clamp operatively connected with the thrust rod.

In German patent No. 1,083,881 there is disclosed to the art an insulation removal apparatus for electrically insulated conductors or lines, wherein two cutters or knives which are pivotably mounted towards one another at a housing and equipped with stops or impact members are retained by a bushing or sleeve. These cutters are opened by means of a piston rod mounted to be axially displaceable in the housing. The piston rod possesses an enlarged or reinforced portion at one end and is exposed to the tension of a spring. The wire from which the insulation is to be removed is introduced between both of the cutters, which thereafter are retracted due to the force of the spring which is effective at the piston rod, and thus such cutters are tightly pressed against the insulating sheathing or jacket. After one or two rotations of the housing the cutters have cut-through the insulation, whereafter, by axially withdrawing the insulation removal apparatus there can be simultaneously withdrawn from the conductor core the insulating jacket which is to be removed.

In Swiss patent No. 567,820 there is disclosed equipment for removing an end section of a plastic sheating or covering of an electrical conductor or wire wherein a clamping device provided with movable clamping jaws is arranged at a housing. The movable clamping jaws can be actuated by a rotatable rod through the intermediary of an eccentric. There is also provided a cutter device having two cooperating cutters or knives which are activated by means of a traction or pull rod arranged to be axially displaceable in the housing and energized by electromagnets, in such a manner that owing to the provision of suitable guide rails the cutters which cut-through the plastic sheathing or jacket are shifted towards one another, and thus the cut end section of the insulation sheathing can be withdrawn in axial direction from the fixedly clamped wire or conductor.

There is also known from German patent publication 1,515,503 a pneumatic device for the removal of the electrical insulation from a wire or conductor, wherein a shaft driven by a rotor is arranged in a housing. Mounted upon the shaft is an axially displaceable, conical piston. When the insulation removal device of this prior art patent is placed into operation, two levers, each tiltable about a pivot point and equipped with a cutting knife and a wire guide, rotatably close about the introduced conductor. Hence, due to the prevailing cutting pressure either the lacquered or enamelled electrical insulation is removed or a plastic sheathing is cut to the region of the stranded wires of the conductor and such is then subsequently withdrawn.

The heretofore discussed prior art equipment for the removal of insulation from electrical conductors or the like as well as other conventional, here not further described insulation removal tools, such as for example insulation removal clamps or the like, during the insulation removal operation partially damage and deform the insulation which remains upon the conductor and produce an undesired, irregular insulation-cutting edge, and additionally, such tools possess relatively large constructional size at the clamping- and cutting region. Hence, the fields of application of such prior art equipment is therefore limited.

According to a still further known technique for the removal of plastic sheathing or insulation covering at electrical conductors, the sheathing is fused down to the stranded wires of the conductor by means of a heated loop or the like. Thereafter, the cut insulation end is withdrawn. With this technique there is the considerable danger or damaging the conductor, especially when the wire or conductor ends are closely situated. Moreover, during the fusing or melting operation there are developed deleterious fumes or vapors and the insulation which remains on the conductor, also with this prior art technique, exhibits an irregular cut- or separation edge.

SUMMARY OF THE INVENTION

Hence, with the foregoing in mind, it is a primary object of the present invention to provide a new and improved construction of insulation removal apparatus for conductors or the like which is not associated with the aforementioned drawbacks and limitations of the prior art proposals.

Another and more specific object of the present invention aims at the provision of an electrical insulation-removal apparatus by means of which there can be partially removed relatively short, spatially closely juxtapositioned insulation sheathing-end sections of an electrical conductor or the like and while forming an exact cut surface, and without, during the insulation removal operation, altering the mechanical structure of the conductor and, furthermore, without permanently deforming or damaging the electrical insulation which remains on the conductor.

Still a further significant object of the present invention is concerned with a novel construction of apparatus for removing insulation from a conductor or the like in a safe, reliable, efficient and easy manner, which apparatus is relatively simple in construction and design, convenient and easy to use, highly reliable in operation, and economical to manufacture.

Now in order to implement these and still further objects of the invention, which will become more readily apparent as the description proceeds, the insulation removal apparatus of the present invention is manifested by the features that the holder clamp together with the thrust rod as well as a stripper clamp arranged in the holder clamp and force-lockingly connected with a traction rod provided in the thrust rod, are axially displaceably guided in a sleeve fixedly connected with the housing. The holder and stripper clamps are constructed and arranged such that, on the one hand, during the holding- and cutting operation the holder clamp together with the thrust rod as well as the stripper clamp together with the traction rod are conjointly axially displaceably guided, and, on the other hand, during the insulation removal operation, the stripper clamp together with the traction rod are guided to be axially displaceable relative to the holder clamp.

The insulation removal apparatus of the present invention affords a number of different advantages. Thus, for instance, the apparatus can be positively applied to the end of the conductor from which there is to be removed the electrical insulation, with optimum accessibility both in the radical as well as also in the axial direction, and without damaging the closely situated wires of the conductor which, for instance, have already been grouped together into a bundle or bunch, or have been already twisted together in a machine suitable for such purpose. Additionally, the needed conductor end, without neglecting the quality of the cut edges, only requires a length of approximately 2 mm in addition to the desired, variable insulation length. The insulation sleeve which is separated from the insulation remaining upon the conductor, is pulled-off through a distance of approximately 1.5 mm, due to the relative movement of the stripper clamp with respect to the holder clamp, and remains upon the conductor until there is carried out a subsequent working operation, mounting of a cable sleeve or pressing-on or otherwise connecting a plug. Hence, there is effectively prevented any fraying of the conductor end. The handling and use of the apparatus is unproblematic and simple, since during the insulation removal operation the conductor end need only be inserted into a cylindrical sleeve attached to the apparatus housing until impacting against a stop, and thereafter, without having to apply any great amount of force, a lever can be depressed down to or towards the housing wall. With this apparatus there was intentionally disregarded the possibility of being able to remove electrical insulation from different diameter conductors with the same piece of equipment.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a side sectional view of a preferred constructional embodiment of electrical insulation-removal apparatus, showing the same in its non-activated condition;

FIG. 2 is an enlarged sectional view of the holding- and cutting element of the apparatus in the position according to the showing of FIG. 1;

FIG. 3 is a cross-sectional view of the arrangement shown in FIG. 2, taken substantially along the line III—III thereof;

DETAILED DESCRIPTION OF THE PREFERRED EMBODIMENTS

Figure 4:
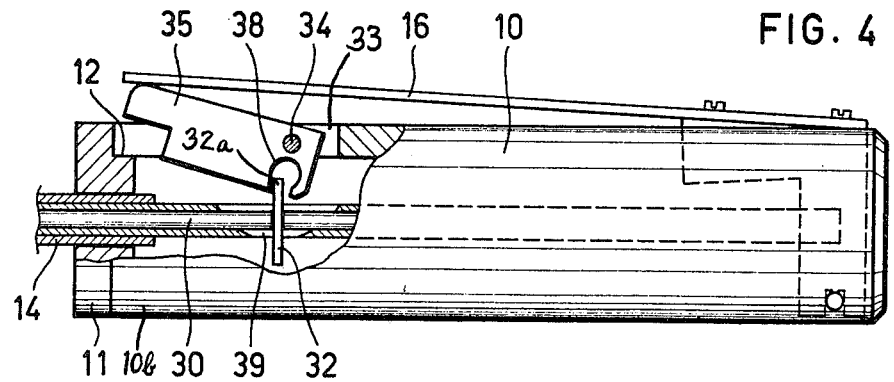
FIG. 4 illustrates in side view and partially in sectional view the apparatus of FIG. 1, but this time in its activated condition or state.

Describing now the drawings, the preferred exemplary embodiment of insulation stripping apparatus will be seen to comprise a preferably cylindrical housing 10, at one end of which a flange 11 is secured with any suitable and therefore not particularly illustrated fastening means to such housing 10 in order to close off the related housing end. The flange 11 is guided in the hollow housing 10 by means of a stepped portion or shoulder 12 and also possesses a bore or opening 13 through which there is inserted a sleeve 14, which sleeve is fixedly connected in any convenient fashion with the flange or end closure plate 13, for instance force fitted or bonded thereat. At the opposite end of the housing 10 there are provided two oppositely situated slots 18 and 19 in which there is guided a thrust or push lever 20. This thrust or push lever 20 is pivotably mounted by a substantially cylindrical pin or pivot member 17 which piercingly extends through the housing wall, generally indicated by reference character 10a. An actuation element, here shown as an actuation lever 16 is attached, for instance by the threaded bolts or screws 16a, with the thrust or push lever 20. Hence, it will be readily evident that both the actuation lever 16 and the therewith connected thrust lever 20 can be rocked in the direction of the housing wall 10a of the housing 10 to assume the respective positions illustrated in FIGS. 4 and 6, and the purpose of which will be discussed more fully hereinafter.

Continuing, within the housing 10 there is arranged a hollow, preferably substantially cylindrical thrust or push rod 25. Thrust rod 25 is guided to be axially displaceable within the hollow sleeve 14 and equally within a bearing 22 provided internally of the housing 10, as best seen by referring to FIG. 1. At the side of the thrust rod 25 which confronts the thrust or push lever 20 such thrust rod 25 is equipped with a slot, generally indicated by reference character 25a, as best seen by referring to FIG. 1. The thrust or push lever 20 engages with the slot 25a and is operatively connected with the thrust or push rod 25 by any suitable fastening expedient, for instance by means of the illustrated cylindrical pin 21.

A pressure or compression spring 24 or equivalent structure is seated upon the thrust rod 25. One end 24a of this spring 24 bears against the bearing means or bearing 22 and its other end 24b is retained at a substantially cylindrical pin 23 or other equivalent expedient. The pressure or compression spring 24 thus retains the thrust rod 25 and therewith also the thrust lever 20 together with the actuation lever 16 in the position shown in FIG. 1. This is the ineffectual position which the insulation stripper apparatus assumes before carrying out the insulation stripping operations at a conductor or the like.

At the front region 10b of the housing 10 there is provided a further substantially slot-shaped recess 33 in which there is guided and supported a trigger lever 35 or the like which is pivotably mounted about the cylindrical pin or pivot 34 piercingly extending through the housing wall 10a.

In FIG. 2 there is illustrated on an enlarged scale the holding- and cutting elements which are arranged substantially coaxially with respect to the sleeve or sleeve member 14. In particular, there will be seen a holder clamp 26 which is fixedly connected with the thrust or push rod 25 by means of a cylindrical pin 27 or equivalent structure as well as a stripper clamp 28 which is fixedly connected with a traction or pull rod 30 by means of a further cylindrical pin 29. The thrust rod 25 and the holder clamp 26 are axially displaceably guided in the sleeve 14 and the stripper clamp 28 is guided to be axially displaceable within the hollow holder clamp 26.

At its free end or end face 42 the holder or holding clamp 26 possesses a clamp-like construction embodying the conductor clamping portions 26a (FIG. 2) and additionally possesses the slots 40 which are substantially uniformly arranged about the periphery of the holder clamp 26 and which extend from the end face 42 preferably approximately to the center or central region of the length of the holder clamp 26. On the other hand, the stripper clamp 28 possesses a cutter- or knife-like construction at its end face 48 which incorporates the cutter or knife portions 28a. The stripper clamp 28 is likewise provided with slots 49, uniformly distributed about the circumference or periphery of such stripper clamp 28, these slots 49 extending from the end face 48 at least up to the center of the length of such stripper clamp 28. The holder clamp 26 and the stripper clamp 28 are preferably mounted and fixed within the sleeve 14 in such a manner that the slots 40 of the holder clamp 26 are arranged in alignment with the slots 49 of the stripper or stripping clamp 28, as best seen by referring to FIG. 3. In the illustrated, preferred constructional embodiment of insulation stripping apparatus as contemplated by the invention, both the holder clamp 26 as well as the stripper clamp 28 are each equipped with four slots 40 and 49, respectively, uniformly arranged about the periphery of the associated clamp. Yet it would be possible, and it is within the contemplation of the invention, to provide either a greater number of such peripherally, uniformly distributed slots, or, however, to provide each such clamp with two respective slots.

At this point there will be considered the mode of operation of the described insulation stripping apparatus, which is as follows: starting from the ineffectual or rest position portrayed in FIG. 1, where the holding- and cutting portions 26a, 28a, are located approximately in the position shown in FIG. 2 and the holder clamp 26 as well as the stripper clamp 28 form a receiving opening 50 (FIG. 3) into which there can be inserted an electrical conductor 15 from which there is to be removed part of its insulation, which conductor has not been particularly shown in FIGS. 1 to 3 but is visible for instance in the showing of FIGS. 5 and 7, there is then operated the actuation lever 16 by moving the same in the direction of the housing wall 10a. Consequently, the thrust rod 25, exposed to the biasing force of the restoring spring 24, together with the holder clamp 26 is forwardly displaced by the thrust lever 20 on the one hand, and the traction rod 30, arranged in the thrust rod 25, together with the stripper clamp 28 is also forwardly displaced in the direction of the flange or end plate 13 due to the frictional forces on the other hand. At the same time, during this first operating phase, an entrainment member 32 which is fixedly connected with the traction or pull rod 30, pivots the trigger lever 35 which is pivotably mounted at the cylinder pin 34 serving as the pivot point or pivot shaft, into the position depicted in FIG. 4, The entrainment member or entrainment means 32 engages at its one end 32a into an appropriately configured opening 38 of the trigger lever 35 and such entrainment member is also guided to be axially displaceable in an approximately arranged recess 39 of the thrust rod 25.

By virtue of the provision of a substantially conical contact or support edge 45 provided at the front region of an inwardly directed, substantially ring-shaped flange 44 of the sleeve 14 and also because of the provision of a substantially conical sliding surface 41 formed likewise at the front region of the holder clamp 26, during this initial operation of the apparatus the insulation of the conductor 15 introduced through the receiving opening 50 up to the region of a spacer pin 31 (FIG. 5) is cut-through. This is possible because during such initial operation the clamp-like constructed end face or end 42 of the slotted holder clamp 26 as well as the cutter-like constructed end face 48 of the slotted stripper clamp 28 uniformly move towards a common center while reducing the size of the receiving opening 50 containing the inserted conductor 15.

As already mentioned, the thrust rod 25 together with the holder clamp 26 as well as the traction or pull rod 30 together with the stripper clamp 28 are simultaneously and conjointly pushed towards the front of the stripper apparatus, so that the entrainment member 32 which is fixedly connected with the traction rod 30, during this operation, assumes the same position in the recess 39, as shown in FIG. 4, as it assumes during the rest or ineffectual position of the apparatus and as shown in FIG. 1.

Figure 6:
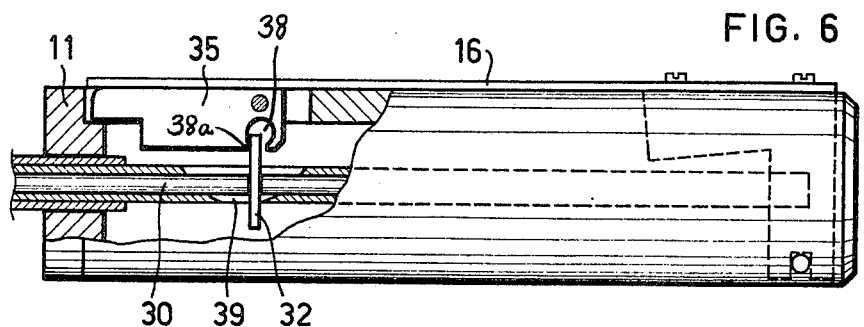
FIG. 6 is a side view of the electrical insulation-removal or stripping apparatus of the invention, again partially in section, and showing such apparatus in its end position for accomplishing the insulation stripping operation.

By further actuating the lever 16 the trigger lever 35 is depressed until coming into contact with the stepped portion or shoulder 12 of the flange or end plate 11, which stepped portion protrudes into the housing 10, for instance as best seen by referring to FIGS. 1, 4 and 6. Consequently, the entrainment member 32 which bears at the inner edge 38a of the opening 38 of the trigger lever 35 together with the traction rod 30 as well as the stripper clamp 28 connected by the cylindrical pin 28 with such traction rod 30 are shifted into the positions shown in FIGS. 6 and 7 respectively, where the not particularly referenced electrical insulation of the electrical conductor or line 15 already has been removed through the distance 43.

Figure 5:
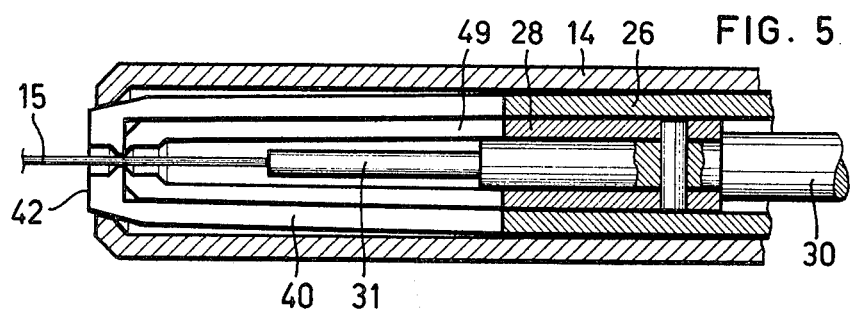
FIG. 5 is a view, similar to the showing of FIG. 2, on an enlarged scale and in section, of the holding- and cutting or cutter elements of the apparatus in the activated position of FIG. 4.
Figure 7:
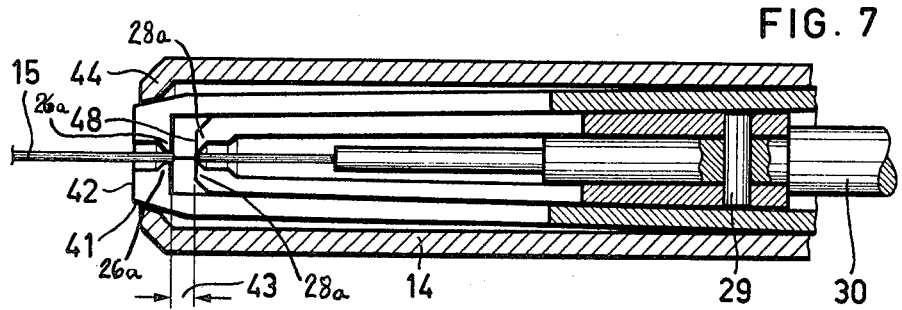
FIG. 7 illustrates on an enlarged scale and again in sectional view the holding- and cutting elements of the apparatus in the position shown in FIG. 6.

During this second operational phase, the thrust rod 25 and the holder clamp 26 remain in the positions shown in FIGS. 5 and 7, due to the provision of an intermediate space 36 between the thrust rod 25 and the stripper clamp 28 as well as because of the provision of a recess 37 in the traction or pull rod 30, and in which recess 37 there is guided the cylindrical pin 27 which interconnects the thrust rod 25 with the holder clamp 26.

After this second operational phase the actuation lever 16 is released, so that the thrust rod 25, exposed to the restoring force of the spring 24, together with the holder clamp 26 and also the actuation lever 16 are again brought back into the position illustrated in FIGS. 1 and 2. As a result, the conductor 15 from which part of the electrical insulation has been removed can be retracted out of the insulation stripper apparatus, or, however, the apparatus can be removed from the conductor end and thus a new working operation can be accomplished. The previously described working steps are carried out within a very short time span, so that apart from realizing extremely good functional reliability of the equipment there is also ensured the enconomies of such electrical insulation-stripper apparatus.

With the illustrated exemplary embodiment the stripper apparatus has been shown activated by a lever system, but it is however equally possible to operate the components responsible for the holding-, cutting- and withdrawal or removal operations with the aid of other means, for instance hydraulically, such as indicated schematically by a conventional hydraulic drive 80 shown in phantom lines in FIG. 1.

While there are shown and described present preferred embodiments of the invention, it is to be distinctly understood that the invention is not limited thereto, but may be otherwise variously embodied and practiced within the scope of the following claims. Accordingly,

What I claim is:

1. An insulation stripping apparatus for partially removing an end section of insulation sheathing of an electrical conductor or the like, comprising:
   a housing;
   a thrust rod;
   a restoring spring for exerting a restoring force upon said thrust rod;
   means mounting said thrust rod to be axially displaceable in said housing against the restoring force of said restoring spring;
   a holder clamp;
   means for operatively connecting the holder clamp with said thrust rod;
   a stripper clamp arranged in said holder clamp;
   a traction rod arranged in said thrust rod;
   means for operatively connecting said stripper clamp with said traction rod;
   a sleeve member fixed to said housing;
   said holder clamp together with said thrust rod and said stripper clamp being guided to be axially displaceable in said sleeve member;
   said holder clamp together with said thrust rod and said stripper clamp together with said traction rod conjointly being guided to be axially displaceable during a holding- and cutting operation at which time the conductor is held and its insulation cut, whereas said stripper clamp together with said traction rod is guided to be axially displaceable relative to said holder clamp during a removal operation when the cut-through insulation of the conductor is removed.

2. the insulation stripping apparatus as defined in claim 1, wherein:
   said holder clamp is provided with a sliding surface;
   said sleeve member includes a forward region equipped with an inwardly directed substantially ring-shaped flange;
   said ring-shaped flange possessing a substantially conical configured contact surface which is substantially complementary to said sliding surface of the holder clamp.

3. The insulation stripping apparatus as defined in claim 1, further including:
   a trigger lever;
   means for pivotably mounting said trigger lever at said housing; and
   entrainment means for operatively connecting said trigger lever with said traction rod.

4. The insulation stripping apparatus as defined in claim 1, wherein:
   said stripper clamp has an end face structured to provide cutter means;
   said holder clamp having an end face confronting the end face of said stripper clamp and structured to provide clamping means;
   said cutter means of said stripper clamp and said clamping means of said holder clamp providing a continuous receiving opening having a substantially common central axis for receiving the conductor from which the insulation is to be removed.

5. The insulation stripping apparatus as defined in claim 1, further including:
   means for actuating the components of the apparatus responsible for the conductor holding-, insulation cutting- and removal operations.

6. The insulation stripping apparatus as defined in claim 5, wherein:
   said actuation means comprises mechanical means.

7. The insulation stripping apparatus as defined in claim 5, wherein:
   said actuation means comprises hydraulic means.

8. An insulation stripping apparatus for partially removing an end section of insulation sheathing of an electrical conductor or the like, comprising:
   a hollow housing;
   a hollow thrust rod;
   a restoring spring for exerting a restoring force upon said thrust rod;
   means mounting said thrust rod to be axially displaceable in said hollow housing against the restoring force of said restoring spring;
   a hollow holder clamp;
   means for operatively connecting the hollow holder clamp with said thrust rod;
   a stripper clamp arranged in said hollow holder clamp;
   a traction rod arranged in said hollow thrust rod;
   means for operatively connecting said stripper clamp with said traction rod;
   a sleeve member carried by said housing;
   said holder clamp together with said thrust rod and said stripper clamp being guided to be axially displaceable in said sleeve member;
   said holder clamp and said stripper clamp being guided to be simultaneously axially displaceable during a conductor holding- and insulation cutting operation at which time the conductor is held and its insulation cut, whereas said stripper clamp is guided to be axially displaceable relative to said holder clamp during an insulation removal operation at which time the cut insulation of the conductor is removed.

9. An insulation stripping apparatus for partially removing an end section of insulation sheathing of an electrical conductor or the like, comprising:
   a housing;
   a thrust rod;
   a restoring spring for exerting a restoring force upon said thrust rod;
   means mounting said thrust rod to be axially displaceable in said housing against the restoring force of said restoring spring;
   a holder clamp having an end face and being provided with a slot means substantially uniformly distributed about the periphery of said holder clamp and extending from said end face up to approximately the central region of the length of said holder clamp, said holder clamp further including a forward, external portion having a continuous, substantially conically configured sliding surface;
   means for operatively connecting the holder clamp with said thrust rod;
   a stripper clamp arranged in said holder clamp;

a traction rod arranged in said thrust rod;
means for operatively connecting said stripper clamp with said traction rod;
a sleeve member fixed to said housing;
said holder clamp together with said thrust rod and said stripper clamp being guided to be axially displaceable in said sleeve member;
said holder clamp together with said thrust rod and said stripper clamp together with said traction rod conjointly being guided to be axially displaceable during a holding- and cutting operation at which time the conductor is held and its insulation cut, whereas said stripper clamp together with said traction rod is guided to be axially displaceable relative to said holder clamp during a removal operation when the cut-through insulation of the conductor is removed.

10. An insulation stripping apparatus for partially removing an end section of insulation sheathing of an electrical conductor or the like, comprising:
a housing;
a thrust rod;
a restoring spring for exerting a restoring force upon said thrust rod;
means mounting said thrust rod to be axially displaceable in said housing against the restoring force of said restoring spring;
a holder clamp;
means for operatively connecting the holder clamp with said thrust rod;
a stripper clamp arranged in said holder clamp, said stripper clamp having an end face and being provided with slot means uniformly distributed about the periphery of said stripper clamp and extending from said end face up to approximately the central region of the length of said stripper clamp;
a traction rod arranged in said thrust rod;
means for operatively connecting said stripper clamp with said traction rod;
a sleeve member fixed to said housing;
said holder clamp together with said thrust rod and said stripper clamp being guided to be axially displaceable in said sleeve member;
said holder clamp together with said thrust rod and said stripper clamp together with said traction rod conjointly being guided to be axially displaceable during a holding- and cutting operation at which time the conductor is held and its insulation cut, whereas said stripper clamp together with said traction rod is guided to be axially displaceable relative to said holder clamp during a removal operation when the cut-through insulation of the conductor is removed.

11. An insulation stripping apparatus for partially removing an end section of insulation sheathing of an electrical conductor or the like, comprising:
a housing;
a thrust rod;
a restoring spring for exerting a restoring force upon said thrust rod;
means mounting said thrust rod to be axially displaceable in said housing against the restoring force of said restoring spring;
a holder clamp having an end face and including slot means uniformly distributed about the region of its periphery and extending from said end face at least partially along the length of said holder clamp;
means for operatively connecting the holder clamp with said thrust rod;
a stripper clamp arranged in said holder clamp;
said stripper clamp having an end face and including slot means substantially uniformly distributed about the periphery of said stripper clamp and extending from said end face thereof at least along part of the length of said stripper clamp;
a traction rod arranged in said thrust rod; means for operatively connecting said stripper clamp with said traction rod;
said connecting means for said holder clamp and stripper clamp fixing said holder clamp and said stripper clamp relative to one another in said sleeve member such that said slot means of said holder clamp are substantially in alignment with said slot means of said stripper clamp;
a sleeve member fixed to said housing;
said holder clamp together with said thrust rod and said stripper clamp being guided to be axially displaceable in said sleeve member;
said holder clamp together with said thrust rod and said stripper clamp together with said traction rod conjointly being guided to be axially displaceable during a holding- and cutting operation at which time the conductor is held and its insulation cut, whereas said stripper clamp together with said traction rod is guided to be axially displaceable relative to said holder clamp during a removal operation when the cut-through insulation of the conductor is removed.

12. An insulation stripping apparatus for partially removing an end section of insulation sheathing of an electrical conductor or the like, comprising:
a housing;
a thrust rod;
a restoring spring for exerting a restoring force upon said thrust rod;
means mounting said thrust rod to be axially displaceable in said housing against the restoring force of said restoring spring;
a holder clamp;
means for operatively connecting the holder clamp with said thrust rod;
a stripper clamp arranged in said holder clamp;
a traction rod arranged in said thrust rod;
means for operatively connecting said stripper clamp with said traction rod;
a trigger lever;
means for pivotably mounting said trigger lever at said housing;
entrainment means for operatively connecting said trigger lever with said traction rod;
said thrust rod being provided with a recess for said entrainment means for permitting relative movement between said holder clamp and said stripper clamp during the removal of the insulation;
said traction rod being provided with a recess;
said means connecting the holder clamp with the thrust rod comprising a pin receivable in said recess of said traction rod;
a sleeve member fixed to said housing;
said holder clamp together with said thrust rod and said stripper clamp being guided to be axially displaceable in said sleeve member;
said holder clamp together with said thrust rod and said stripper clamp together with said traction rod conjointly being guided to be axially displaceable during a holding-cutting operation at which time the conductor is held and its insulation cut, whereas said stripper clamp together with said traction rod is guided to be axially displaceable relative to said holder clamp during a removal operation when the cut-through insulation of the conductor is removed.

* * * * *